US008023976B2

(12) United States Patent
Shao et al.

(10) Patent No.: US 8,023,976 B2
(45) Date of Patent: Sep. 20, 2011

(54) METHOD AND SYSTEM FOR ACCURATE CLOCK SYNCHRONIZATION FOR COMMUNICATION NETWORKS

(75) Inventors: Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1174 days.

(21) Appl. No.: 11/800,392

(22) Filed: May 3, 2007

(65) Prior Publication Data

US 2008/0273521 A1    Nov. 6, 2008

(51) Int. Cl.
*H04B 15/00* (2006.01)
(52) U.S. Cl. ........................................ 455/502
(58) Field of Classification Search .................... 455/502
See application file for complete search history.

(56) References Cited

U.S. PATENT DOCUMENTS

| | | | | |
|---|---|---|---|---|
| 6,975,652 | B1 * | 12/2005 | Mannette et al. | 370/503 |
| 7,567,544 | B2 * | 7/2009 | Myles et al. | 370/338 |
| 2004/0093435 | A1 * | 5/2004 | Purho | 709/400 |
| 2006/0072694 | A1 * | 4/2006 | Dai et al. | 375/354 |
| 2007/0218870 | A1 * | 9/2007 | Satoh | 455/404.2 |

OTHER PUBLICATIONS

IEEE Wireless Lan Edition (2003), "A compilation based on IEEE Std 802.11TM—1999 (R2003) and its amendments," IEEE Standards Information Network, IEEE Press, 706 pages.
IEEE P802.11e/D13.0 (Jan. 2005), Part 11: Wireless LAN Medium Access Control (MAC) and Physical Layer (PHY) specifications: "Amendment: Medium Access Control (MAC) Quality of Service (QoS) Enhancements," LAN/MAN Committee of the IEEE Computer Society, 198 pages.
Mills, D., "Internet Time Synchronization: The Network Time Protocol[1,2,3]", Global States and Time in Distributed Systems, IEEE Computer Society Press, 1994, pp. 1-14.
Mills, D., "Simple Network Time Protocol (SNTP) Version 4 for IPv4, IPv6 and OSI," Network Working Group, Request for Comments: 2030, Oct. 1996, 17 pages.

* cited by examiner

*Primary Examiner* — Marisol Figueroa
(74) *Attorney, Agent, or Firm* — Kenneth L. Sherman, Esq.; Michael Zarrabian, Esq.; Myers Andras Sherman & Zarrabian LLP

(57) ABSTRACT

A high accuracy clock synchronization mechanism between a sender and a receiver in a communication network achieves time synchronization using broadcast beacons, directly at the PHY/MAC layer of the sender and the receiver, to minimize synchronization delay jitter. This provides a more efficient synchronization method than either NTP or SNTP, because multiple handshaking information exchange is avoided. Further, using beacons avoids the overhead of introducing additional synchronization packets in higher layer synchronization.

72 Claims, 8 Drawing Sheets

100

190

METHOD AND SYSTEM FOR ACCURATE CLOCK SYNCHRONIZATION FOR COMMUNICATION NETWORKS

FIELD OF THE INVENTION

The present invention relates to clock synchronization between communication devices, and in particular to accurate clock synchronization for devices communicating in wireless local area networks (WLANs).

BACKGROUND OF THE INVENTION

Time synchronization protocols, such as Network Time Protocol (NTP) and Simple Network Time Protocol (SNTP), have been extensively studied for traditional Internet and distributed systems. These protocols require multiple handshaking information exchanges in order to minimize estimation of the propagation delay error.

However, in WLANs, propagation delay is not the main source of synchronization errors, and extensive handshaking messages may increase bandwidth consumption. Further, said time synchronization protocols require intensive computation, and consequently, they are inappropriate for deployment in WLANs.

The IEEE 802.11 protocol specification provides a simple clock synchronization solution, wherein an access point (AP) can read the system clock upon generating a beacon frame, and then place timestamp information into the same beacon frame. When stations (STAs) receive a beacon, they can set their system clocks to the value of the timestamp in the beacon to synchronize with the AP. However, this synchronization method is not accurate because it ignores the processing delay of the beacon at the Media Access Control (MAC) and the physical (PHY) layers of both the AP and the STAs, and further ignores the propagation delay through the communication channel between the AP and the STAs.

According to the IEEE 802.11e protocol specification, the MAC layer provides primitives and an interface for a higher layer to perform more accurate time synchronization. This is accomplished by indicating the occurrence of the end of the last symbol of a particular data frame to the higher layer, wherein the higher layer records a timestamp and sends the timestamp through the higher layer data packets. However, the delay jitter caused by interaction between the higher layer and the MAC layer, and between the MAC layer and the PHY layer is still not eliminated or minimized, leading to time synchronization inaccuracy.

There is, therefore, a need for a method and system for accurate clock synchronization for devices communicating in WLANs.

BRIEF SUMMARY OF THE INVENTION

The present invention provides a high accuracy clock synchronization mechanism for communication between devices in a network. In one embodiment, time synchronization is achieved using broadcast beacons directly at the PHY/MAC layer of a sender (e.g., an AP) and a receiver (e.g., a STA) in a WLAN, to minimize synchronization delay jitter. This provides a more efficient synchronization method than either NTP or SNTP because multiple handshaking information exchanges are avoided. Further, using beacons, the present invention avoids overhead of introducing additional synchronization packets in higher layer synchronization.

In one embodiment, time synchronization between a sender and a receiver connected via a communication link comprises the steps of: sending a first synchronization signal from the sender to the receiver and determining the sender local time when the first synchronization signal was placed on the link for transmission; receiving the first synchronization signal at the receiver, and determining the receiver local time when the first synchronization signal was received from the link; determining a difference between: (a) said sender local time when the first synchronization signal was placed on the link for transmission, and (b) said receiver local time when the first synchronization signal was received from the link; and updating the receiver local time based on said difference, if necessary, to time synchronize the receiver with the sender.

Sending the first synchronization signal includes the steps of creating a first synchronization packet and transmitting the synchronization packet on the link. Further, determining said sender local time includes the step of reading a local sender clock to obtain the local time when the symbol at a predefined position of the synchronization packet was placed on the link for transmission to the receiver. In addition, receiving the first synchronization signal includes the step of receiving the first synchronization packet from the link at the receiver; and determining said sender local time includes the step of reading a local receiver clock when the symbol at a predefined position of the synchronization packet is received from the link at the receiver.

Preferably, sending the first synchronization signal includes the steps of creating a first synchronization packet in the MAC layer, providing the first synchronization packet from the MAC layer to the PHY layer, and then the PHY layer transmitting the synchronization packet on the link; and determining said sender local time includes the steps of: the PHY layer determining the sender local time when the first synchronization packet is placed on the link by the PHY layer for transmission to the receiver. Further, preferably, receiving the first synchronization signal includes the step of: the receiver PHY layer receiving the first synchronization packet from the link; and determining said receiver local time includes the step of: the receiver PHY layer determining the receiver local time when the first synchronization packet was received from the link. As such, determining said time difference includes the steps of: the receiver MAC layer determining the difference between: (a) said sender local time when the first synchronization packet was placed on the link for transmission, and (b) said receiver local time when the first synchronization packet was received from the link. Preferably, the synchronization packet comprises a beacon packet.

These and other features, aspects and advantages of the present invention will become understood with reference to the following description, appended claims and accompanying figures.

DETAILED DESCRIPTION OF THE INVENTION

The present invention provides a high accuracy clock synchronization mechanism for communication between devices in a network. In one embodiment, time synchronization is achieved using broadcast beacons over a wireless channel, directly at the PHY/MAC layers of a sender (e.g., an AP) and a receiver (e.g., a STA) in a WLAN, to minimize synchronization delay jitter.

The AP and the STA implement a frame structure that is used for data transmission therebetween, using packet transmission in a MAC layer and a physical (PHY) layer. In a typical AP, a MAC layer receives a data packet including payload data, and attaches a MAC header thereto, in order to construct a MAC Protocol Data Unit (MPDU). The MAC header includes information such as a source address (SA) and a destination address (DA). The MPDU is a part of a PHY Service Data Unit (PSDU) and is transferred to a PHY layer in the AP to attach a PHY header (i.e., a PHY preamble) thereto to construct a PHY Protocol Data Unit (PPDU) The PHY header includes parameters for determining a transmission scheme including a coding/modulation scheme. Typically, the most reliable coding/modulation scheme is applied to a PHY signal field in the PHY header, and an additional cyclic redundancy check (CRC) is added to ensure this information is received correctly at the receiver. The MAC header and payload data are usually treated equally and transmitted using the same coding/modulation scheme, which is less robust than that for the PHY signal field of the PHY header. Further, before transmission as a packet from the AP to the STA, a preamble is attached to the PPDU, which can include channel estimation and synchronization information.

Figure 1:
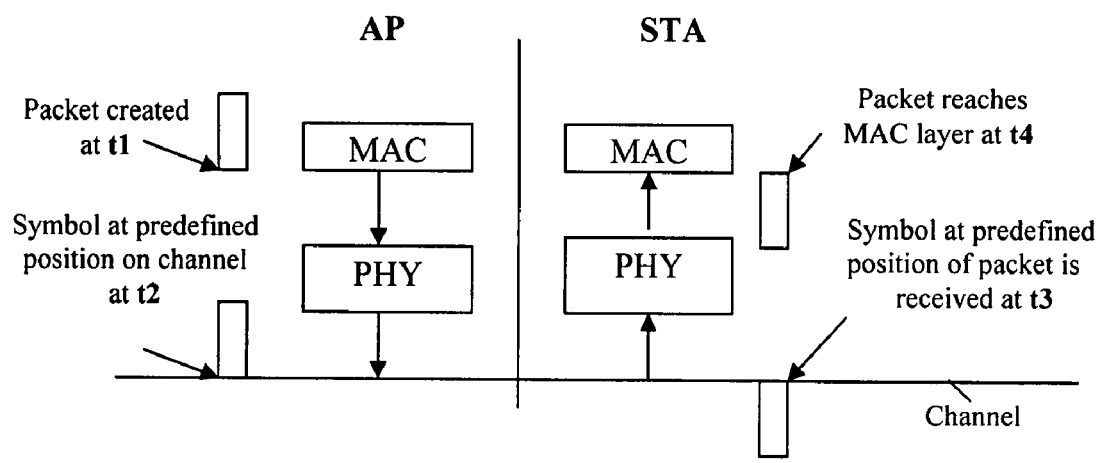
FIG. 1 shows example timestamps in packet transmission between a sender (e.g., an AP) and a receiver (e.g., a STA) in a WLAN.
Figure 2:
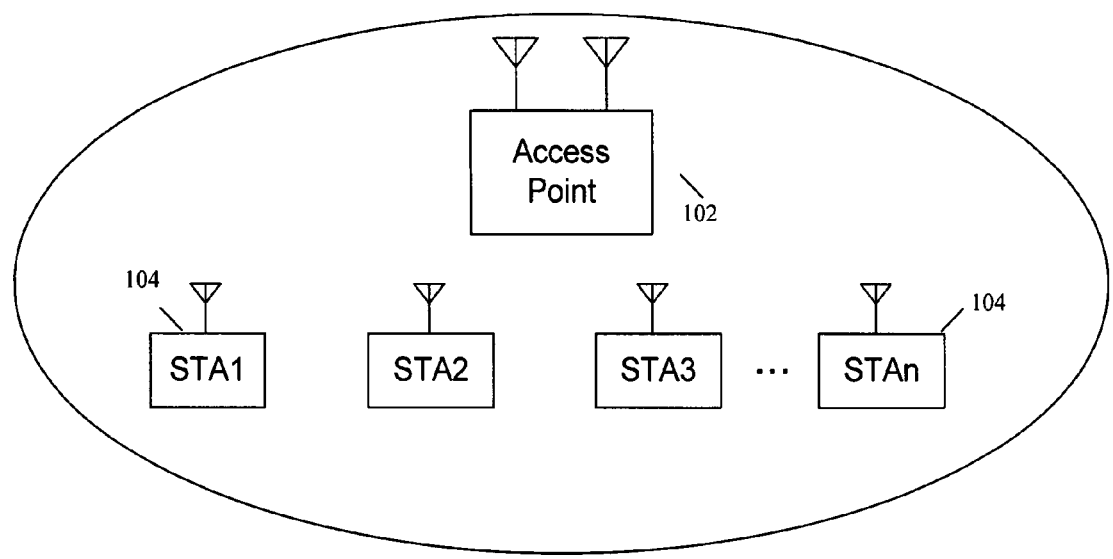
FIG. 2 shows a functional block diagram of an example WLAN including an AP and multiple STAs.

Referring to the example timing diagram in FIG. 1 in conjunction with a WLAN 100 shown in FIG. 2 the AP 102 sends a message (e.g., a synchronization packet) to the STA 104 (e.g., STA3) to synchronize the clocks therebetween. There are four important time instances related to this synchronization process, i.e. t1, t2, t3 and t4, wherein:

t1 is the time when a whole packet is built in the MAC layer of the AP 102. It is the timestamp carried in the packets;

t2 is the time when the symbol at a predefined position of the packet is placed on the channel by the PHY layer of the AP 102;

t3 is the time when the symbol at the predefined position of the packet is received from the channel by the PHY layer of the STA 104; and t4 is the time when the received packet passes the PHY layer of the STA 104 and reaches the MAC layer.

Figure 3:
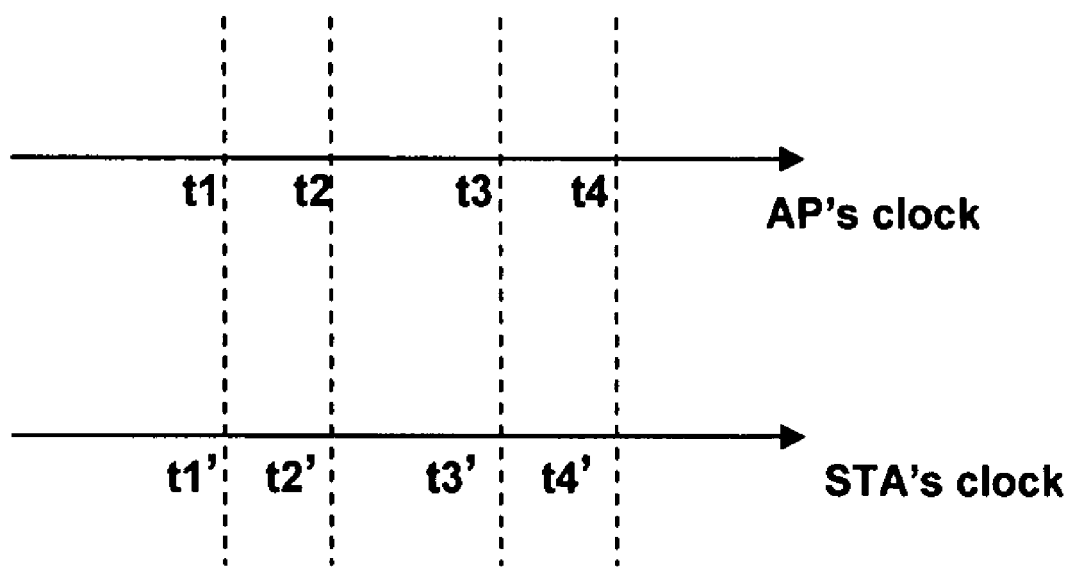
FIG. 3 shows example clock comparison between the AP and the STA in FIG. 1.

As there is clock drift, local clock/time readings are different at the AP 102 and at the STA 104. An example timing relationship between the AP's clock and the STA's clock is shown in FIG. 3. It is assumed that at the local clock times t1, t2, t3, and t4 at the AP 102, the corresponding local clock readings times at the STA 104 are t1', t2', t3' and t4', respectively.

As shown in FIG. 3, the difference between the time when a whole packet is built in the MAC layer of the AP 102 (i.e., AP MAC layer), and the time when the packet passes the PHY layer of the STA 104 (i.e., STA PHY layer) and reaches the MAC layer of the STA 104 (i.e., STA MAC layer), can be determined as: t4−t1=(t2−t1)+(t3−t2)+(t4−t3).

Figure 4:
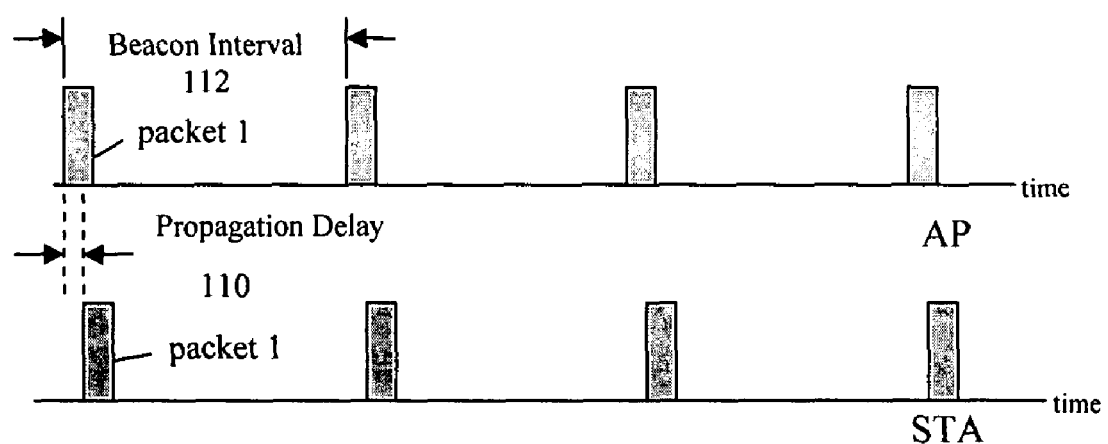
FIG. 4 shows an example of propagation delay in FIG. 1.

The value t4−t1 includes two main parts (time periods). The first part is propagation delay and the second part is processing delay, described below:

Propagation delay is the propagation time, t3−t2, of a bit in the channel (e.g., a radio frequency transmission channel). FIG. 4 shows an example propagation delay 110 in transmitting a packet (e.g., beacon) from the AP to the STA. The propagation delay 110 is generally negligible relative to a beacon interval 112, and is a function of the physical distance between the STA and the AP. Thus, the propagation delay varies for different STAs which are at different distances from the AP. However, once the positions of the STAs relative to the AP are fixed, the corresponding propagation delays are constant values. Propagation delay is small and relatively easy to calculate compared with processing delay. For example, if the distance between an AP and a STA is less than 100 meters, the propagation delay is less than $100/(3*10^8)$=333.3 ns. In one example, wherein beacons are used as synchronization packets, the beacon interval indicates the interval between synchronization packets.

Processing delay includes access delay and receive delay.

Access delay, t2−t1, is the time needed for the symbol at a predefined position in a packet, processed at the AP's network interface (i.e., AP PHY layer), to be placed on the transmission channel. In other words, access delay is the time for a bit to pass from the AP MAC layer through the AP PHY layer to the channel. Thus, to minimize access delay, the packet timestamp t1 should be as close as possible to time t2 when the symbol at the predefined position is put on the channel.

Receive delay, t4−t3, is the time needed for the symbol at the predefined position in a received packet from the channel, processed at the STA's network interface (PHY layer), to reach the STA MAC layer. Thus, to minimize the receive delay, receiving time t4' at the STA MAC layer should be as close as possible to the time to t3' when the symbol at the predefined position is received at the STA hardware interface (STA PHY layer) from the channel.

The symbol at the predefined position of the synchronization packet can be the first symbol of the PSDU, the last symbol of the PSDU, or a symbol at some other fixed position (Nth symbol). The AP and the STA (or sender and receiver) can define the position as a constant or define it through control message exchanges before the synchronization process.

Although the above analysis is performed for the AP and the STAs, such analysis is also applicable to synchronization between any two neighboring STAs. Thus, according to the present invention, to achieve higher time synchronization accuracy between the AP and the STAs, the local clock time is read in a place as close to the event trigger point as possible, which implies that local clock time is read in the PHY layer in order to minimize the propagating and processing delay.

Further, the access delay and the receive delay are estimated and minimized. Both access delay and receive delay are system and implementation dependent. If the local clock is read in the PHY layer, the typical processing delay is between 5-10 us (microseconds) for WLANs, and 10-40 us for a CC1000 based radio. However if, as conventional, the local clock is read at the MAC layer, the buffer between the MAC layer and the PHY layer, leading to queuing delay, must be taken into consideration in synchronization. Packets at the AP may need to wait in a queue before being actually handed to the PHY layer at the sender.

According to the present invention, when a packet is created by the MAC layer in the AP, the packet is timestamped with the time of the local clock when the packet arrives at the AP PHY layer for transmission over the channel, rather than the conventional timestamping at the AP MAC layer. This reduces processing delay (i.e., reduces access delay at the AP). Similarly, the STA clock is read at the STA PHY layer, rather than at the MAC layer, when the packet is received by the STA PHY layer. Further, the STA clock is updated as necessary based on the received packet timestamp. This further reduces processing delay (i.e., reduces receive delay at the STA).

An example high accuracy time synchronization method for WLANs utilizes synchronization packets, preferably broadcast beacons, is described below. An attribute, i.e. phyTxTime, is added to the PHY MIB (Management Information Base) to record the local time/clock (i.e., t2) when the symbol at the predefined position of a first packet (first synchronization packet) is actually placed on the channel by the AP PHY layer. In an initialization phase, the first packet, without an actual transmission timestamp, is sent by the AP and is received by the STA. Another attribute, i.e. phyRxTime, is added to the PHY MIB to record the local time t3' at the STA when the symbol at the predefined position of the latest packet arrives at the STA PHY layer from the channel. As such, upon receipt of said first packet, the STA PHY layer records the local clock time when the symbol at the predefined position of the first packet is received from the channel by the STA PHY layer, into phyRxTime. As this is the first packet, the STA clock is not updated based on the timestamp of the first packet.

Further, a MAC attribute, i.e. phyRxTimePrevious, is added to the MAC MIB, such that when the STA MAC layer correctly receives the latest packet from the STA PHY layer, the value in phyRxTime is copied to phyRxTimePrevious by the STA MAC layer. As such, in this example, when the STA MAC layer correctly receives the first packet from the STA PHY layer, the value in phyRxTime (i.e., local time when the STA PHY layer received the first packet) is copied to phyRxTimePrevious by the STA MAC layer. The copied value is used later in determining any difference in clock time between the AP and the STA, as described further below.

After the first packet is transmitted, when a second packet (follow-up synchronization packet) is prepared for transmission by the AP MAC layer, the AP MAC layer copies the recorded time from phyTxTime into the timestamp of this second packet. Then the AP PHY layer reads the local clock for the time when the symbol at the predefined position of this second packet is placed on the channel by the AP PHY layer, and updates phyTxTime with the time of transmission of the second packet. As such, the updated time in phyTxTime reflects the actual time the symbol at the predefined position of the second packet was placed on the channel, and this updated time is used by the STA MAC layer as the timestamp for a third synchronization packet, and so on.

When the STA receives the second packet, the STA PHY layer reads the local time and stores the local time in phyRxTime, then passes the received second packet to the STA MAC layer. When the STA MAC layer correctly receives the second packet from the STA PHY layer, the value in phyRxTime (i.e., the local time when the second packet was received at the STA PHY layer) is copied to phyRxTimePrevious by the STA MAC layer. Further, the STA MAC layer retrieves the timestamp of the second packet, which provides the STA with the exact time at the AP when the first packet was placed on the channel by the AP PHY layer. Knowing that exact time, the STA can more accurately synchronize its clock with the clock of the AP.

Specifically, the STA MAC layer determines the difference D between: (a) the exact time at the AP when the first packet was placed on the channel by the AP PHY layer (i.e., using the time stamp in the second packet) and (b) the local time when the symbol at the predefined position of the first packet was received from the channel by the STA PHY layer (i.e., phyRxTimePrevious). This difference is a function of the actual difference AD between the AP clock and the STA clock, wherein: AD=D−propagation delay.

If the distance between the AP and the STA can be properly estimated, then the propagation delay can be determined based on the estimated distance, and used to determine the actual time difference AD=D−propagation delay. Otherwise, since the propagation delay is very small, relative to other delays then the actual difference AD can be essentially equal to the value D.

If the actual time difference AD is not zero, then the AP clock and the STA clock are not synchronized. In that case, the STA clock is updated based on the value AD to eliminate the difference between the STA clock and the AP clock, thereby synchronizing the AP clock and the STA clock to the same time value. The STA clock is updated as necessary only based on local times at the AP PHY layer and the STA PHY layer, eliminating the AP MAC layer, and the STA MAC layer, processing delays from calculation of actual time difference AD for synchronization.

The above process steps for time synchronization involving the second packet are repeated for the third synchronization packet and synchronization packets thereafter, such that the AP and STA remain time synchronized.

Figure 5:
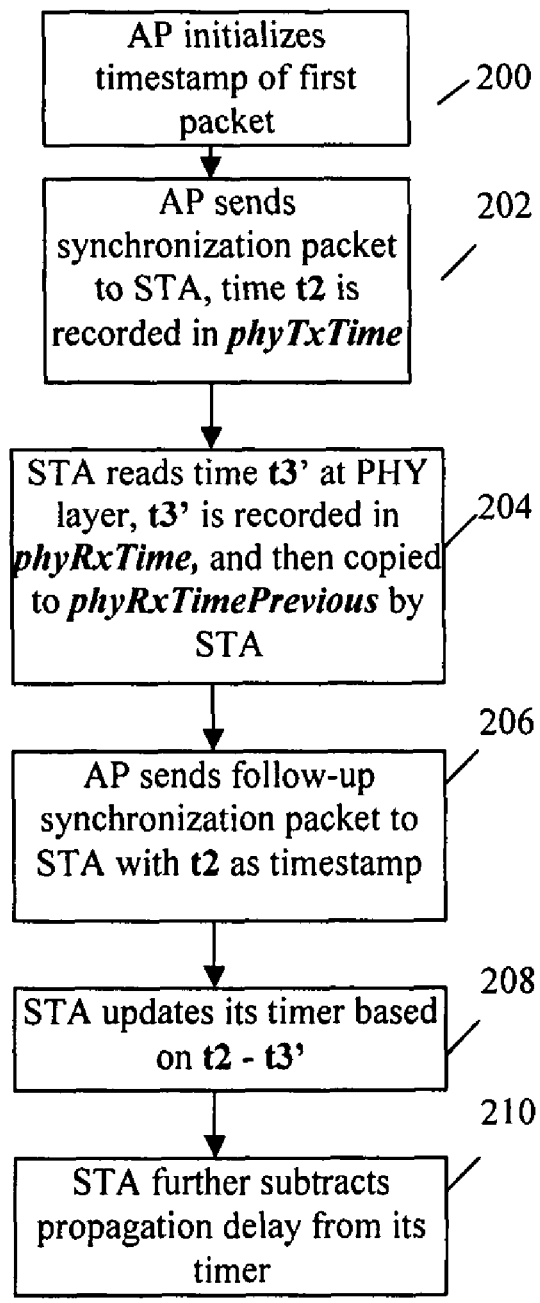
FIG. 5 shows a flowchart of steps of a clock synchronization method for packet communication between a sender and a receiver in a WLAN, according to an embodiment of the present invention.

Accordingly, referring to the flowchart in FIG. 5, an example implementation of a high accuracy time synchronization process 190 according to the present invention includes the steps of, at an initialization stage:

Step 200: The AP initializes the time stamp of first synchronization packet. In one example, the AP places a dummy value (initialization value) in the timestamp of the first synchronization packet.

Step 202: The AP MAC layer sends the first synchronization packet to the STA via the channel, and the AP records (updates) the AP local clock/time t2 into phyTxTime.

Step 204: The STA PHY layer receives the first synchronization packet from the channel. The STA PHY layer reads the STA local clock/time at exactly t3' when the symbol at the predefined position of the first synchronization packet arrives at the PHY of the STA, whereby the receive delay is minimized. The STA PHY layer records/updates t3' into phyRxTime. When the STA MAC layer correctly receives the first synchronization packet from the STA PHY layer, the value t3' in phyRxTime is copied to phyRxTimePrevious by the STA MAC layer.

Step 206: The AP then sends to the STA a follow-up synchronization packet which carries the actual transmission time t2 (i.e., from phyTxTime) of the first synchronization packet.

Step 208: Upon receiving the follow-up synchronization packet, the STA sets its timer (clock) by adding the value t2−t3' (i.e., timestamp−phyRxTimePrevious) to it, wherein t2 is obtained from the timestamp of the current (follow-up) synchronization packet, and t3' is obtained from the phyRxTimePrevious.

Step 210: If the distance between the AP and the STA can be estimated to determine the propagation delay, the STA can further adjust its timer by subtracting the propagation delay.

After the initialization stage: (1) The timestamp in the synchronization packet always carries the actual transmission time t2 of the previous synchronization packet, (2) phyRxTimePrevious always carries the actual receiving time t3' of the previous synchronization packet, and (3) phyRxTime carries the actual receiving time t3' of the current synchronization packet. The STA adjusts its local clock/timer by adding t2−t3' (i.e., timestamp−phyRxTimePrevious) to the clock every time it receives a synchronization packet. As such, the STA timer (clock) remains synchronized with the timer (clock) of the AP.

Figure 6:
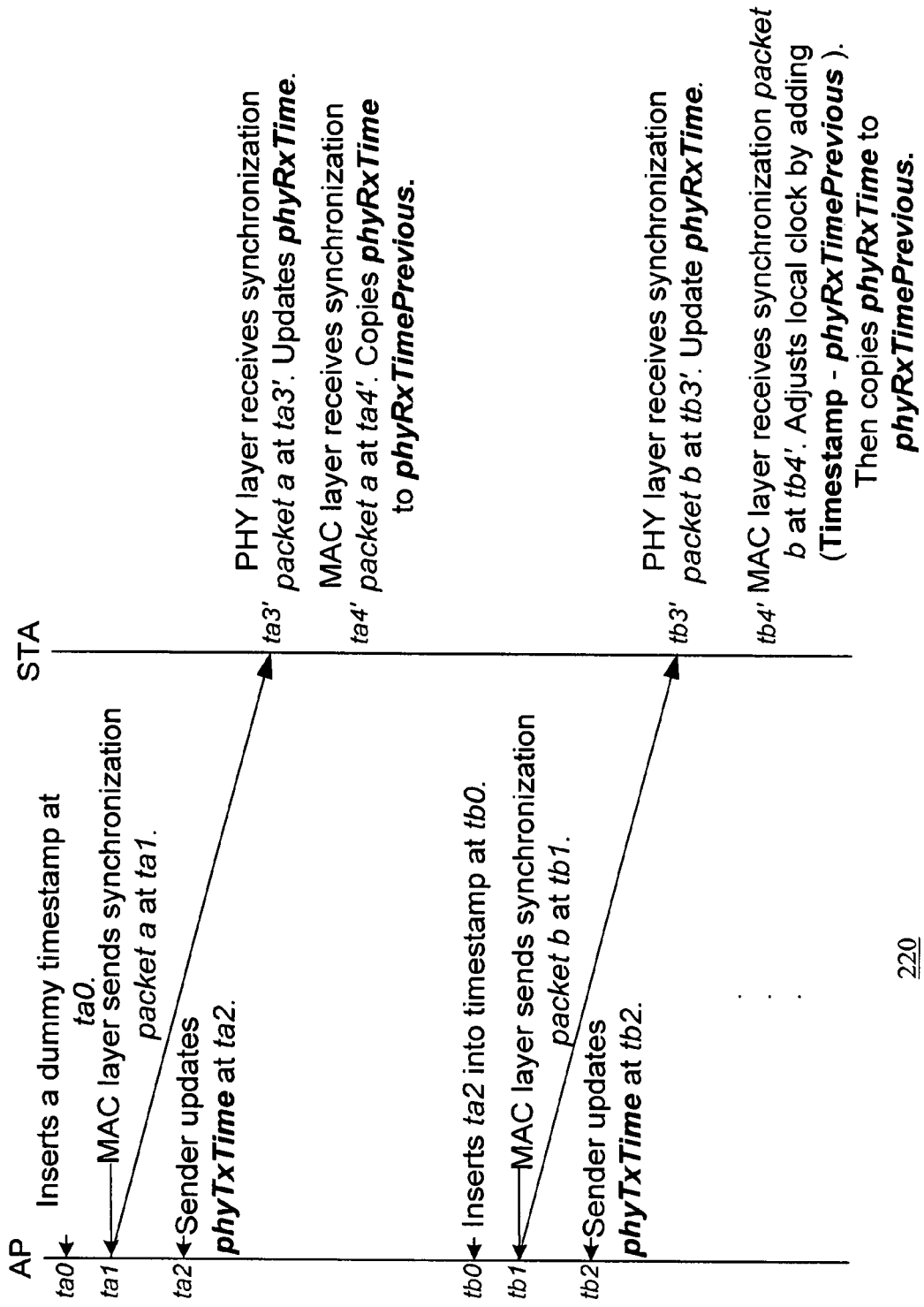
FIG. 6 shows an example event diagram for clock synchronization for packet communication between a sender and a receiver in a WLAN, according to an embodiment of the present invention.

FIG. 6 shows an example time event diagram 220 for time synchronization between a sender (e.g., AP) and a receiver (e.g., STA) in a WLAN, according to an implementation of the synchronization steps of FIG. 5. As shown in FIG. 6, during initialization, at time ta0 the sender places a dummy timestamp (initialization value) in the timestamp (i.e., phyTxTime) of a first synchronization packet, packet a. At time ta1 the MAC layer of the sender sends the synchronization packet a to the STA. At time ta2, the sender record/updates phyTxTime field with ta2 (i.e., actual transmission time of packet a). At time ta3', the PHY layer of the receiver receives the synchronization packet a, and updates phyRxTime with ta3'. At time ta4' the MAC layer of the receiver receives the synchronization packet a from the PHY layer of the receiver, and copies phyRxTime (i.e., ta3') into phyRxTimePrevious.

Then, at time tb0, the sender records ta2 as timestamp (i.e., phyTxTime) of another synchronization packet b. At time tb1, the MAC layer of the sender sends the synchronization packet b to the receiver. At time tb2, the sender updates phyTxTime with tb2. At time tb3', the PHY layer of the receiver receives the synchronization packet b from the sender. The receiver updates phyRxTime with tb3'. At time tb4', the MAC layer of the receiver receives the synchronization packet b from the PHY layer of the receiver, and adjusts its timer (local clock) by adding the value ta2−ta3' (i.e., packet b timestamp−phyRxTimePrevious) to its timer. Then, phyRxTime is copied to phyRxTimePrevious.

The timestamp in the synchronization packet b always carries the actual transmission time, ta2, of the previous synchronization packet a. The field phyRxTimePrevious always carries the actual receiving time, ta3', of the synchronization packet a. The field phyRxTime always carries the actual receiving time tb3' of the synchronization packet b. The receiver adjusts its timer by adding ta2−ta3' (i.e., timestamp−phyRxTimePrevious) every time it receives a synchronization packet. As such, the STA timer (clock) remains synchronized with the timer (clock) of the AP.

In one example, the beacon signal that is broadcast from the AP to the STAs, can be used as the synchronization packet (other types of data/control/management frames, may also be used). As such, according to the above example, the timestamp in each beacon always carries the actual starting transmission time of the previous beacon (instead of the transmission time of the current beacon). Using beacons for synchronization as described herein, avoids the overhead of introducing extra synchronization packets otherwise.

By using beacons as synchronization packets specified in the IEEE 802.11 protocol, the above example implementation of the present invention introduces a change to the meaning of the timestamp field of the beacon. The STA reads the local clock time when the symbol at the predefined position of a packet arrives at the STA PHY layer. A possible result is that the STA reads the clock whenever a packet arrives, at the cost of energy consumption. In order to save energy, the present invention further provides adding an attribute, i.e. phyTimeOn, to the PHY MIB so that the STA PHY layer reads the clock when there is a synchronization request. The attribute phyTimeOn is a Boolean type, and controls reading the clock on/off status in order to avoid overhead.

If the beacon timestamp is needed for some other purpose than the transmission time of the previous beacon, according to the present invention, then the second timestamp field (i.e. TimestampPrevious) is added to the beacon frame body. The field TimestampPrevious carries the actual starting transmission time for the previous beacon. Timestamp specified in IEEE 802.11 carries the estimated starting transmission time for the current beacon. The STA adjusts its local clock by adding (TimestampPrevious−phyRxTimePrevious) to synchronize with the AP clock.

Figure 7:
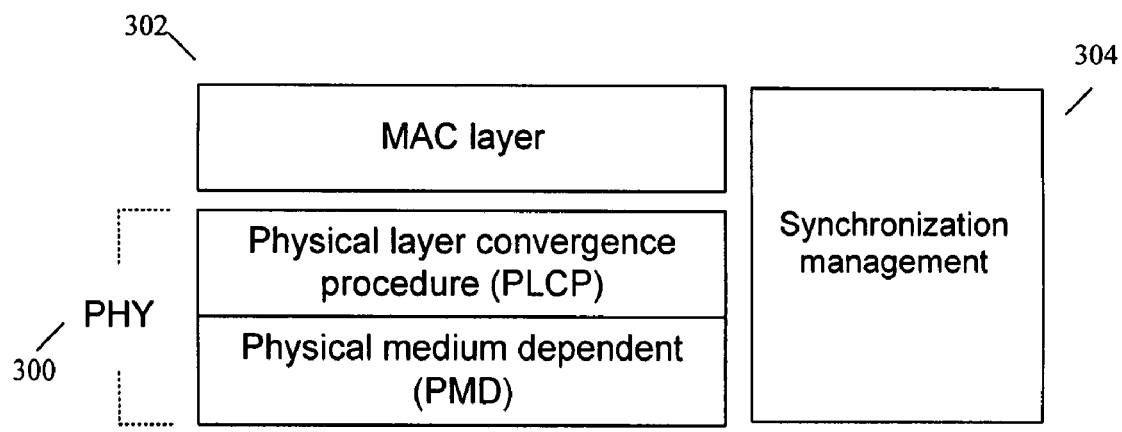
FIG. 7 shows an example functional block diagram of the PHY/MAC layers implementing time synchronization, according to an embodiment of the present invention.

FIG. 7 shows the protocol architecture for the clock synchronization mechanism protocol in both the AP 102 and the STAs 104 in FIG. 2, according to an embodiment of the present invention. The protocol architecture in a STA 104 implements a time synchronization mechanism according to the above steps. In the WLAN 100, the AP 102 provides central coordination. The STA 104 (e.g., PC, handheld device, consumer electronic (CE) device such as a MP3 player, mini-TV and wireless camera equipped with a network interface card (NIC) etc.), implements a PHY layer 300 (FIG. 7), a MAC layer 302, and a synchronization management function 304, implementing the above steps. The synchronization management function 304 performs time synchronization directly at the PHY/MAC layers to minimize the synchronization delay jitter.

As shown in FIG. 7, the PHY layer 300 includes two sub layers: a physical layer convergence procedure (PLCP) and a physical medium dependent (PMD). The NIC provides the capability to: detect an existing WLAN; join or synchronize with the WLAN; authenticate with the WLAN; transmit frames to other stations in the WLAN; receive frames from other stations in the WLAN, and encrypt/decrypt frames being transmitted or received. For some WLANs, APs are used to provide a central (or "point") coordination function for WLANs. APs are also referred to as "base stations." Physically, an AP provides a "center point" for a collection of stations. Usually an AP has a NIC implementing a WLAN PHY layer, a MAC layer, and a management function, and it also has other network interface cards connecting to a wired network.

Figure 8:
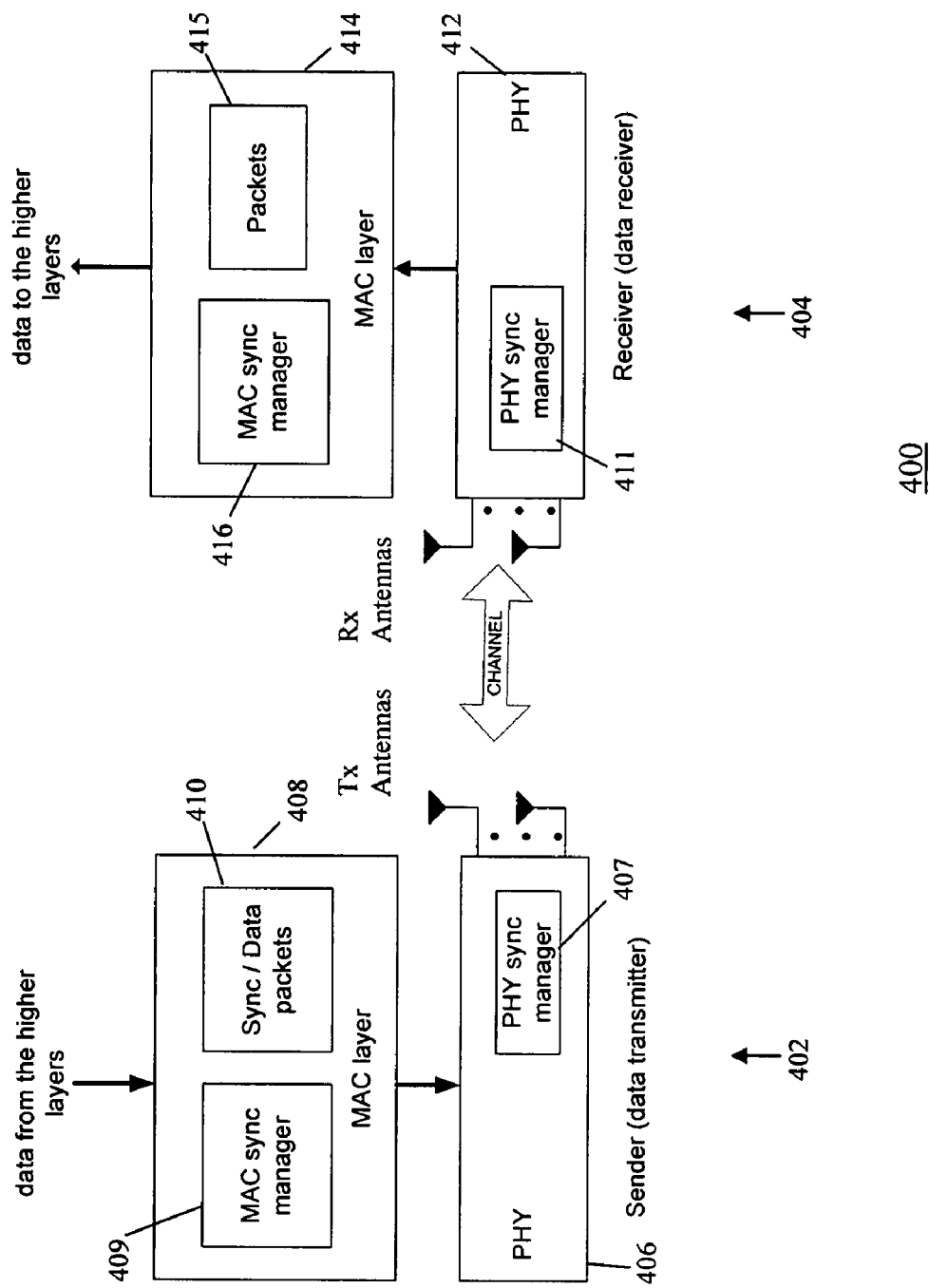
FIG. 8 shows an example functional block diagram of a WLAN implementing clock synchronization, according to another embodiment of the present invention.

FIG. 8 shows a functional block diagram of an example wireless (e.g., radio frequency over the air Multiple-input multiple-output) system 400, implementing the above methods of time synchronization, according to an embodiment of the present invention. The system 400 includes a sender (Tx) 402 such as an AP, and a receiver (Rx) 404 such as a STA.

The sender 402 includes a PHY layer 406 and a MAC layer 408. The PHY layer 406 includes a PHY Sync Manager 407, and the MAC layer 408 includes a MAC sync manager 409, wherein the sender PHY sync manager 407 and the MAC sync manager 409 collectively implement clock synchronization steps according to the present invention such as described above for an AP in relation to FIGS. 6 and 7. Further, the PHY sync manager 407 and/or the MAC sync manager 409 operate on synchronization/data packets 410 as described.

The receiver 404 includes a PHY layer 412 and a MAC layer 414. The PHY layer includes a PHY sync manager 411, and the MAC layer 414 includes a MAC sync manager 416, wherein the receiver PHY sync manager 411 and the MAC sync manager 416 collectively implement clock synchronization steps according to the present invention such as described above for a STA in relation to FIGS. 6 and 7. The MAC layer 414 hands data packets 415 to higher layers at the receiver side.

The AP MAC sync manager 409 inserts a dummy timestamp to the first synchronization packet, sends synchronization packets through the AP PHY, inserts phyTxTime of the previous synchronization packet to each synchronization packet. The AP PHY sync manager 407 updates phyTxTime, and reports phyTxTime to the AP MAC layer sync manager 409.

The STA MAC sync manager 416 receives synchronization packets from the STA PHY, copies phyRxTime to phyRxTimePrevious, adjusts the local clock by adding (Timestamp−phyRxTimePrevious). The STA PHY sync manager 411 receives synchronization packets from the sender, updates phyRxTime and reports it to the STA MAC sync manager 416.

The PHY layers 406 and 412, can implement the IEEE 802.11 standard. The MAC layers 408 and 414, and the PHY layers 406 and 412, comprise several elements, however, in FIG. 8, only the elements 407, 409, 410, 411, 415, 416 are shown, based on which, the above clock synchronization methods of the present invention are implemented.

Accordingly, the present invention achieves higher accuracy than existing time synchronization approaches because according to the present invention the synchronization is performed directly at the PHY/MAC layer to minimize the synchronization delay jitter. A time synchronization approach according to the present invention is more efficient than either NTP or SNTP because multiple handshaking information exchange is avoided. Using beacons as described herein, the present invention avoids overhead of introducing additional synchronization packets in higher layer synchronization.

Although the present invention has been described above in relation to wireless networks, as those skilled in the art will recognize, the present invention is also useful with communication systems wherein the devices are connected by other means such as wire, cable, fiber, etc.

As such, the present invention is not limited to the example wireless implementations described above.

Further, as is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of time synchronization between a sender and a receiver connected via a communication link, comprising:
   sending a first synchronization signal from the sender to the receiver, and determining the sender local time when the first synchronization signal was placed on the link for transmission, wherein sending the first synchronization signal includes:
   creating a first synchronization packet in a Media Access Control (MAC) layer of the sender, providing the first synchronization packet from the MAC layer to a physical (PHY) layer of the sender, and the PHY layer transmitting the synchronization packet on the link; and
   determining said sender local time includes:
   the sender PHY layer determining the sender local time when the first synchronization packet is placed on the link by the sender PHY layer for transmission to the receiver;
   receiving the first synchronization signal at the receiver, and determining the receiver local time when the first synchronization signal was received from the link;
   determining a time difference D1 between: (a) a retrieved sender local time when the first synchronization packet was placed on the link for transmission, and (b) said recorded receiver local time when the first synchronization packet was received from the link, wherein determining the time difference D1 further includes: determining a difference between (a) the retrieved sender local time phyTxTime for transmission of the first synchronization packet, and (b) a retrieved receiver local time phyPxTimePrevious for receipt of the first synchronization packet at the receiver;
   updating the receiver local time based on said time difference D1 to time synchronize the receiver with the sender;
   maintaining a phyRxTimePrevious in a MAC Management Information Base (MIB); and upon receiving a synchronization packet at the receiver MAC layer from the receiver PHY layer, copying the value in phyRxTime to phyRxTimePrevious.

2. The method of claim 1 wherein:
sending the first synchronization signal includes: creating a first synchronization packet, and transmitting the synchronization packet on the link; and
determining said sender local time includes: reading a local sender clock to obtain the local time when a symbol at a predefined position of the synchronization packet was placed on the link for transmission to the receiver.

3. The method of claim 2 wherein:
receiving the first synchronization signal includes: receiving the first synchronization packet from the link at the receiver; and
determining said sender local time includes: reading a local receiver clock when the symbol at a predefined position of the synchronization packet is received from the link at the receiver.

4. The method of claim 3 wherein:
receiving the first synchronization signal includes: a PHY layer at the receiver receiving the first synchronization packet from the link; and
determining said receiver local time includes: the receiver PHY layer determining the receiver local time when the first synchronization packet was received from the link.

5. The method of claim 4 wherein determining said time difference includes:
a MAC layer at the receiver determining the difference between: (a) said sender local time when the first synchronization packet was placed on the link for transmission, and (b) said receiver local time when the first synchronization packet was received from the link.

6. The method of claim 5 wherein said synchronization packet comprises a beacon packet.

7. The method of claim 6 wherein said synchronization packet comprises a beacon packet including a timestamp indicating the actual starting transmission time of a previous beacon.

8. The method of claim 6 wherein said synchronization packet comprises a beacon packet including a first timestamp indicating the transmission time of the beacon, and a second timestamp indicating the actual starting transmission time of a previous synchronization beacon packet.

9. The method of claim 1 wherein the communication link comprises a wireless communication channel.

10. The method of claim 1 wherein:
sending a first synchronization packet further includes recording the sender local time when the first synchronization packet is placed on the link for transmission to the receiver; and
receiving the first synchronization packet at the receiver further includes recording the receiver local time when the first synchronization packet was received from the link;
the method further comprising:
wherein the second synchronization packet is time stamped with said recorded sender local time when the first synchronization packet was placed on the link; and
receiving the second synchronization packet at the receiver and retrieving its timestamp.

11. The method of claim 10 wherein:
sending the first synchronization packet includes: creating the first synchronization packet in the sender MAC layer, providing the first synchronization packet from the MAC layer to the sender PHY layer, the sender PHY layer transmitting the synchronization packet on the link, and the PHY layer recording the sender local time when the first synchronization packet is placed on the link by the sender PHY layer.

12. The method of claim 11 wherein:
receiving the first synchronization packet includes: the receiver PHY layer receiving the first synchronization packet from the link, and recording said receiver local time when the first synchronization packet was received from the link at the receiver PHY layer.

13. The method of claim 12 wherein determining said time difference includes:
the receiver MAC layer determining the difference between: (a) said sender local time when the first synchronization packet was placed on the link for transmission, and (b) said receiver local time when the first synchronization packet was received from the link.

14. The method of claim 10 further including:
maintaining a phyTxTime attribute in a physical (PHY) Management Information Base (MIB), such that recording said sender local time for transmission of a synchronization packet further includes recording said sender local time in phyTxTime.

15. The method of claim 14 wherein timestamping the second synchronization packet further includes:
timestamping the second synchronization packet with said recorded value in phyTxTime, indicating sender local time when the first synchronization packet was placed on the link.

16. The method of claim 15 wherein sending the second synchronization packet further includes recording in phyTxTime the sender local time when the second synchronization packet was placed on the link.

17. The method of claim 16 further including:
maintaining a phyRxTime attribute in the PHY MIB, such that recording said receiver local time for receipt of a synchronization packet at the receiver PHY layer further includes recording said receiver local time in phyRxTime.

18. The method of claim 17 wherein receiving the second synchronization packet at the receiver further includes: upon receiving the second synchronization packet at the receiver MAC layer from the receiver PHY layer, copying the value in phyRxTime to phyRxTimePrevious.

19. The method of claim 18 further including: upon receiving the second synchronization packet at the receiver MAC layer from the receiver PHY layer, retrieving the timestamp of the second synchronization packet at the receiver MAC layer.

20. The method of claim 19 further comprising:
sending a second and third synchronization packet from the sender to the receiver, wherein the third synchronization packet is timestamped with the value recorded in phyTxTime indicating said sender local time when the second synchronization packet was placed on the link.

21. The method of claim 16 further including:
recording the sender local time for transmission of the third synchronization packet in phyTxTime.

22. The method of claim 21 further including:
receiving the third synchronization packet at the receiver and retrieving its timestamp;
recording the receiver local time for receipt of the synchronization packet at the receiver PHY layer in phyRxTime;
upon receiving the third synchronization packet at the receiver MAC layer from the receiver PHY layer, copying the value in phyRxTime to phyRxTimePrevious, and retrieving the timestamp of the third synchronization packet at the receiver MAC layer;
determining a difference D2 between: (a) the retrieved sender local time phyTxTime for transmission of the second synchronization packet, and (b) the receiver local time phyRxTimePrevious for receipt of the second synchronization packet at the receiver; and
updating the receiver local time based on said time difference D2, if necessary, to time synchronize the receiver with the sender.

23. A communication system comprising:
a sender and a receiver, configured to communicate over a communication link;
the sender comprising a synchronization manager configured for sending a first synchronization signal to the receiver, and determine the sender local time when the first synchronization signal was placed on the link for transmission, wherein the sender synchronization manager is further configured for creating a first synchronization packet in the sander Media Access Control (MAC) layer, wherein the first synchronization packet is provided from the sender MAC layer to the sender physical (PHY) layer for transmitting the synchronization packet on the link, and the sender PHY layer determines the sender local time when the first synchronization packet is placed on the link by the sender PHY layer for transmission to the receiver;
the receiver comprising a synchronization manager configured for:
determining (a) the retrieved sender local time phyTxTime for transmission of the first synchronization packet, and (b) the receiver local time phyRxTimePrevious for receipt of the first synchronization packet at the receiver, for determining a time difference D1 between: (a) the retrieved sender local time when the first synchronization packet was placed on the link for transmission, and (b) said recorded receiver local time when the first synchronization packet was received from the link, and for sending a second and third synchronization packet from the sender to the receiver, wherein the third synchronization packet is timestamped with the value recorded in phyTxTime indicating said sender local time when the second synchronization packet was placed on the link, and to update the receiver local time based on said time difference D1 to time synchronize the receiver with the sender, wherein the receiver synchronization manager is configured to maintain a phyRxTimePrevious in a MAC Management Information Base (MIB), upon receiving a synchronization packet at the receiver MAC layer from the receiver PHY layer, copy the value in phyRxTime to phyRxTimePrevious;

wherein the sender and the receiver perform time synchronization for communication over the communication link.

24. The system of claim 23 wherein:
the sender synchronization manager is further configured to create a first synchronization packet and transmitting the synchronization packet on the link as the first synchronization signal; and
the sender synchronization manager is further configured to determine said sender local time by reading a local sender clock to obtain the local time when a symbol at the predefined position of the synchronization packet was placed on the link for transmission to the receiver.

25. The system of claim 24 wherein:
the receiver synchronization manager is further configured to determine said sender local time by reading a local receiver clock when the symbol at the predefined position of the synchronization packet is received from the link at the receiver.

26. The system of claim 25 wherein:
the receiver synchronization manager is further configured to receive the first synchronization packet at the receiver PHY layer from the link, and determine the receiver local time when the first synchronization packet was received from the link at the receiver PHY layer.

27. The system of claim 26 wherein the receiver synchronization manager is further configured to determine said time difference at the receiver MAC layer as the difference between said sender local time when the first synchronization packet was placed on the link for transmission, and said receiver local time when the first synchronization packet was received from the link.

28. The system of claim 27 wherein said synchronization packet comprises a beacon packet.

29. The system of claim 28 wherein said synchronization packet comprises a beacon packet including a timestamp indicating the actual starting transmission time of a previous beacon.

30. The system of claim 28 wherein said synchronization packet comprises a beacon packet including a first timestamp indicating the transmission time of the beacon, and a second timestamp indicating the actual starting transmission time of a previous synchronization beacon packet.

31. The system of claim 23 wherein the communication link comprises a wireless communication channel.

32. The system of claim 23 wherein:
the sender synchronization manager is further configured to record the sender local time when the first synchronization packet is placed on the link for transmission to the receiver;
the receiver synchronization manager is further configured to record the receiver local time when the first synchronization packet was received from the link;
wherein the second synchronization packet is timestamped with said recorded sender local time when the first synchronization packet was placed on the link; and
the receiver communication manager is further configured to receive the second synchronization packet at the receiver and retrieve its timestamp to determine the time difference D1 between the retrieved sender local time when the first synchronization packet was placed on the link for transmission and said recorded receiver local time when the first synchronization packet was received from the link.

33. The system of claim 32 wherein:
the sender synchronization manager is further configured to create the first synchronization packet in the sender MAC layer, wherein the first synchronization packet is provided from the MAC layer to the sender PHY layer for transmission on the link, and the sender local time when the first synchronization packet is placed on the link by the PHY layer is recorded at the sender PHY layer.

34. The system of claim 33 wherein:
the receiver synchronization manager is further configured to receive the first synchronization packet from the link at the receiver PHY layer, and record said receiver local time when the first synchronization packet was received from the link at the receiver PHY layer.

35. The system of claim 34 wherein the receiver synchronization manager is further configured to determine, at the receiver MAC layer, the difference between said sender local time when the first synchronization packet was placed on the link for transmission, and said receiver local time when the first synchronization packet was received from the link.

36. The system of claim 32 wherein the sender synchronization manager is further configured to maintain a phyTxTime attribute in a physical (PHY) Management Information Base (MIB), such that the recorded sender local time includes the sender local time in phyTxTime.

37. The system of claim 36 wherein the sender synchronization manager is further configured to timestamp the second synchronization packet with said recorded value in phyTxTime, indicating sender local time when the first synchronization packet was placed on the link.

38. The system of claim 37 wherein the sender synchronization manager is further configured to record in phyTxTime the sender local time when the second synchronization packet was placed on the link.

39. The system of claim 38 wherein the receiver synchronization manager is further configured to maintain a phyRxTime attribute in the PHY MIB, such that the recorded said receiver local time for receipt of a synchronization packet at the receiver PHY layer includes recording said receiver local time in phyRxTime.

40. The system of claim 39 wherein the receiver synchronization manager is configured such that upon receiving the second synchronization packet at the receiver MAC layer from the receiver PHY layer, the receiver synchronization manager copies the value in phyRxTime to phyRxTimePrevious.

41. The system of claim 39 wherein the receiver synchronization manager is configured such that upon receiving the second synchronization packet at the receiver MAC layer from the receiver PHY layer, the receiver synchronization manager retrieves the timestamp of the second synchronization packet at the receiver MAC layer.

42. The system of claim 41 wherein the receiver synchronization manager is configured to determine said time difference D1 by determining the difference between: the retrieved sender local time phyTxTime for transmission of the first synchronization packet, and the receiver local time phyRxTimePrevious for receipt of the first synchronization packet at the receiver.

43. The system of claim 38 wherein:
the sender synchronization manager is further configured to record the sender local time for transmission of the third synchronization packet in phyTxTime.

44. The system of claim 43 wherein:
the receiver synchronization manager is further configured to retrieve the timestamp of the third synchronization packet received at the receiver, record the receiver local time for receipt of the synchronization packet at the receiver PHY layer in phyRxTime, and upon receiving the third synchronization packet at the receiver MAC layer from the receiver PHY layer, copy the value in phyRxTime to phyRxTimePrevious, and retrieving the timestamp of the third synchronization packet at the receiver MAC layer; and
the receiver synchronization manager is further configured to determining a difference D2 between the retrieved sender local time phyTxTime for transmission of the second synchronization packet and the receiver local time phyRxTimePrevious for receipt of the second synchronization packet at the receiver, and to update the receiver local time based on said time difference D2, if necessary, to time synchronize the receiver with the sender.

45. A transmission sender configured to communicate over a communication link, the sender comprising:
a sender communication module configured to send a first synchronization signal to a receiver; and
a sender synchronization manager configured to determine the sender local time when the first synchronization signal was placed on the link for transmission, wherein the sender synchronization manager is further configured for:
recording the sender local time when the first synchronization packet is placed on the link for transmission to the receiver;
sending a second synchronization packet from the sender to the receiver, wherein the second synchronization packet is timestamped with said recorded sender local time when the first synchronization packet was placed on the link; and
sending a third synchronization packet from the sender to the receiver, wherein the third synchronization packet is timestamped with the value recorded in phyTxTime, indicating said sender local time when the second synchronization packet was placed on the link, and to record the sender local time for transmission of the third synchronization packet in phyTxTime,
wherein the receiver retrieves the second packet timestamp to determine a time difference D1 between the retrieved sender local time when the first synchronization packet was placed on the link for transmission and said recorded receiver local time when the first synchronization packet was received from the link, and further update the receiver local time based on said time difference D1 to time synchronize the receiver with the sender;
wherein the sender and the receiver perform time synchronization for communication over the communication link, wherein the receiver determines a difference between said sender local time when the first synchronization signal was placed on the link for transmission and the receiver local time when the first synchronization signal was received from the link, and updates the receiver local time based on said difference, if necessary, to time synchronize the receiver with the sender.

46. The sender of claim 45 wherein:
the sender synchronization manager is further configured to create a first synchronization packet and transmitting the synchronization packet on the link as the first synchronization signal; and
the sender synchronization manager is further configured to determine said sender local time by reading a local sender clock to obtain the local time when a symbol at the predefined position of the synchronization packet was placed on the link for transmission to the receiver.

47. The sender of claim 45 wherein:
the sender synchronization manager is further configured to create a first synchronization packet in the sender Media Access Control (MAC) layer, wherein the first synchronization packet is provided from the sender MAC layer to the sender physical (PHY) layer for transmitting the synchronization packet on the link, and the sender PHY layer determines the sender local time when the first synchronization packet is placed on the link by the sender PHY layer for transmission to the receiver.

48. The sender of claim 47 wherein said synchronization packet comprises a beacon packet.

49. The sender of claim 48 wherein said synchronization packet comprises a beacon packet including a timestamp indicating the actual starting transmission time of a previous beacon.

50. The sender of claim 48 wherein said synchronization packet comprises a beacon packet including a first timestamp indicating the transmission time of the beacon, and a second timestamp indicating the actual starting transmission time of a previous synchronization beacon packet.

51. The sender of claim 45 wherein the communication link comprises a wireless communication channel.

52. The sender of claim 51 wherein:
the sender synchronization manager is further configured to create the first synchronization packet in the sender MAC layer, wherein the first synchronization packet is provided from the MAC layer to the sender PHY layer for transmission on the link, and the sender local time when the first synchronization packet is placed on the link by the PHY layer is recorded at the sender PHY layer.

53. The sender of claim 51 wherein the sender synchronization manager is further configured to maintain a phyTxTime attribute in a physical (PHY) Management Information Base (MIB), such that the recorded sender local time includes the sender local time in phyTxTime.

54. The sender of claim 53 wherein the sender synchronization manager is further configured to timestamp the second synchronization packet with said recorded value in phyTxTime, indicating sender local time when the first synchronization packet was placed on the link.

55. The sender of claim 54 wherein the sender synchronization manager is further configured to record in phyTxTime the sender local time when the second synchronization packet was placed on the link.

56. A transmission receiver configured to communicate over a communication link, the receiver comprising:
a receiver communication module that is configured to receive a synchronization signal including a packet over a communication link from a sender; and
a receiver synchronization manager configured for determining a time difference D1 between: (a) a retrieved sender local time when the first synchronization packet was placed on the link for transmission, and (b) said recorded receiver local time when the first synchronization packet was received from the link, wherein determining the time difference D1 further includes determining a time difference between (a) the retrieved sender local time phyTxTime for transmission of the first synchronization packet, and (b) the receiver local time phyRxTimePrevious for receipt of the first synchronization packet at the receiver, wherein the receiver synchronization manager further configured for sending a second and third synchronization packet from the sender to the receiver, wherein the third synchronization packet is timestamped with the value recorded in phyTxTime indicating said sender local time when the second synchronization packet was placed on the link, and updates the receiver local time based on said time difference D1 to time synchronize the receiver with the sender, the synchronization manager further configured for:
receiving the first synchronization packet at the receiver physical (PHY) layer from the link, and determine the receiver local time when the first synchronization packet was received from the link at the receiver PHY layer;
determining said time difference at the receiver Media Access Control (MAC) layer as the difference between said sender local time when the first synchronization packet was placed on the link for transmission, and said receiver local time when the first synchronization packet was received from the link; and
maintaining a phyRxTimePrevious in a MAC MIB, upon receiving a synchronization packet at the receiver MAC layer from the receiver PHY layer, copy the value in phyRxTime to phyRxTimePrevious.

57. The receiver of claim 56 wherein:
the receiver synchronization manager is further configured to determine said sender local time by reading a local receiver clock when the symbol at the predefined position of the synchronization packet is received from the link at the receiver.

58. The receiver of claim 57 wherein said synchronization packet comprises a beacon packet.

59. The receiver of claim 58 wherein said synchronization packet comprises a beacon packet including a timestamp indicating the actual starting transmission time of a previous beacon.

60. The receiver of claim 58 wherein said synchronization packet comprises a beacon packet including a first timestamp indicating the transmission time of the beacon, and a second timestamp indicating the actual starting transmission time of a previous synchronization beacon packet.

61. The receiver of claim 60 wherein:
the receiver synchronization manager is further configured to receive the first synchronization packet from the link at the receiver PHY layer, and record said receiver local time when the first synchronization packet was received from the link at the receiver PHY layer.

62. The receiver of claim 61 wherein the receiver synchronization manager is further configured to determine, at the receiver MAC layer, the difference between said sender local time when the first synchronization packet was placed on the link for transmission, and said receiver local time when the first synchronization packet was received from the link.

63. The receiver of claim 62 wherein the receiver synchronization manager is further configured to maintain a phyRxTime attribute in a physical (PHY) Management Information Base (MIB), such that the recorded said receiver local time for receipt of a synchronization packet at the receiver PHY layer includes recording said receiver local time in phyRxTime.

64. The receiver of claim 63 wherein the receiver synchronization manager is configured such that upon receiving the second synchronization packet at the receiver MAC layer from the receiver PHY layer, the receiver synchronization manager copies the value in phyRxTime to phyRxTimePrevious.

65. The receiver of claim 64 wherein the receiver synchronization manager is configured such that upon receiving the second synchronization packet at the receiver MAC layer from the receiver PHY layer, the receiver synchronization manager retrieves the timestamp of the second synchronization packet at the receiver MAC layer.

66. The receiver of claim 65 wherein the receiver synchronization manager is configured to determine a time difference D1 by determining the difference between: the retrieved sender local time phyTxTime for transmission of the first synchronization packet, and the receiver local time phyRxTimePrevious for receipt of the first synchronization packet at the receiver.

67. The receiver of claim 66 wherein:
the receiver synchronization manager is further configured to receive, and retrieve the timestamp of, a third synchronization packet received at the receiver, record the receiver local time for receipt of the synchronization packet at the receiver PHY layer in phyRxTime, and upon receiving the third synchronization packet at the receiver MAC layer from the receiver PHY layer, copy the value in phyRxTime to phyRxTimePrevious, and retrieving the timestamp of the third synchronization packet at the receiver MAC layer;
the receiver synchronization manager is further configured to determine a difference D2 between the retrieved sender local time phyTxTime for transmission of the second synchronization packet and the receiver local time phyRxTimePrevious for receipt of the second synchronization packet at the receiver, and to update the receiver local time based on said time difference D2, if necessary, to time synchronize the receiver with the sender.

68. The receiver of claim 56 wherein the communication link comprises a wireless communication channel.

69. A sender configured to communicate over a communication link, the sender comprising:
a sender communication module configured to transmit a first synchronization signal; and
a sender synchronization manager configured for:
determining the sender local time when the first synchronization signal was placed on the link for transmission;
recording the sender local time when the first synchronization packet is placed on the link for transmission;
transmitting a second synchronization packet, wherein the second synchronization packet is timestamped with said recorded sender local time when the first synchronization packet was placed on the link; and
transmitting a third synchronization packet, wherein the third synchronization packet is timestamped with the value recorded in phyTxTime, indicating said sender local time when the second synchronization packet was placed on the link, and to record the sender local time for transmission of the third synchronization packet in phyTxTime,
wherein the second packet timestamp is used to determine a time difference D1 between a retrieved sender local time when the first synchronization packet was placed on the link for transmission and said recorded local time when the first synchronization packet was received from the link, and further update the local time based on said time difference D1 for time synchronization; and wherein the sender performs time synchronization for communication over the communication link, wherein a difference between said sender local time is determined when the first synchronization signal was placed on the link for transmission and the receiver local time when the first synchronization signal was received from the link, and updates the local time based on said difference, if necessary, for time synchronization.

70. A method for communicating using a sender configured to communicate over a communication link, the method comprising:
   transmitting a first synchronization signal from a sender communication module;
   using the sender synchronization manager for:
      determining the sender local time when the first synchronization signal was placed on the link for transmission
      recording the sender local time when the first synchronization packet is placed on the link for transmission;
      transmitting a second synchronization packet, wherein the second synchronization packet is timestamped with said recorded sender local time when the first synchronization packet was placed on the link; and
      transmitting a third synchronization packet, wherein the third synchronization packet is timestamped with the value recorded in phyTxTime, indicating said sender local time when the second synchronization packet was placed on the link, and to record the sender local time for transmission of the third synchronization packet in phyTxTime,
      wherein the second packet timestamp is used to determine a time difference D1 between a retrieved sender local time when the first synchronization packet was placed on the link for transmission and said recorded local time when the first synchronization packet was received from the link, and further update the local time based on said time difference D1 for time synchronization; and
      wherein the sender performs time synchronization for communication over the communication link, wherein a difference between said sender local time is determined when the first synchronization signal was placed on the link for transmission and the receiver local time when the first synchronization signal was received from the link, and updating the local time based on said difference, if necessary, for time synchronization.

71. A receiver configured to communicate over a communication link, the receiver comprising:
   a communication module configured to receive a first synchronization signal; and
   a synchronization manager configured for:
      determining local time when the first synchronization signal was placed on the link for transmission;
      recording the local time when the first synchronization packet is placed on the link for transmission to the receiver;
      receiving a second synchronization packet, wherein the second synchronization packet is timestamped with said recorded local time when the first synchronization packet was placed on the link; and
      receiving a third synchronization packet, wherein the third synchronization packet is timestamped with the value recorded in phyTxTime, indicating said local time when the second synchronization packet was placed on the link, and to record the local time for transmission of the third synchronization packet in phyTxTime,
   wherein the receiver retrieves the second packet timestamp to determine a time difference D1 between the retrieved local time when the first synchronization packet was placed on the link for transmission and said recorded receiver local time when the first synchronization packet was received from the link, and further update the receiver local time based on said time difference D1 for time synchronization; and
   wherein time synchronization is performed for communication over the communication link, wherein the receiver determines a difference between said local time when the first synchronization signal was placed on the link for transmission and the receiver local time when the first synchronization signal was received from the link, and updates the receiver local time based on said difference, if necessary, for time synchronization.

72. A method to communicate using a receiver over a communication link, the method comprising:
   receiving a first synchronization signal using a communication module;
   using a synchronization manager for:
      determining local time when the first synchronization signal was placed on the link for transmission;
      recording the local time when the first synchronization packet is placed on the link for transmission to the receiver;
      receiving a second synchronization packet, wherein the second synchronization packet is timestamped with said recorded local time when the first synchronization packet was placed on the link; and
      receiving a third synchronization packet, wherein the third synchronization packet is timestamped with the value recorded in phyTxTime, indicating said local time when the second synchronization packet was placed on the link, and to record the local time for transmission of the third synchronization packet in phyTxTime;
   retrieving the second packet timestamp by the receiver for determining a time difference D1 between the retrieved local time when the first synchronization packet was placed on the link for transmission and said recorded receiver local time when the first synchronization packet was received from the link, and further updating the receiver local time based on said time difference D1 for time synchronization; and
   performing time synchronization for communication over the communication link, wherein the receiver is configured for determining a difference between said local time when the first synchronization signal was placed on the link for transmission and the receiver local time when the first synchronization signal was received from the link, and updating the receiver local time based on said difference, if necessary, for time synchronization.

* * * * *